US012651402B2

(12) United States Patent
Li et al.

(10) Patent No.: US 12,651,402 B2
(45) Date of Patent: Jun. 9, 2026

(54) METHOD AND APPARATUS FOR RENDERING TRANSPARENT POLYHEDRON

(71) Applicant: Beijing Zitiao Network Technology Co., Ltd., Beijing (CN)

(72) Inventors: Xiaofeng Li, Beijing (CN); Yi Guo, Beijing (CN); Bo Lin, Beijing (CN); Shanyue Huang, Beijing (CN); Xi Gao, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 69 days.

(21) Appl. No.: 18/567,263

(22) PCT Filed: Jul. 20, 2022

(86) PCT No.: PCT/CN2022/106692
§ 371 (c)(1),
(2) Date: Dec. 5, 2023

(87) PCT Pub. No.: WO2023/005757
PCT Pub. Date: Feb. 2, 2023

(65) Prior Publication Data
US 2024/0265623 A1     Aug. 8, 2024

(30) Foreign Application Priority Data
Jul. 30, 2021     (CN) .......................... 202110875234.0

(51) Int. Cl.
*G06T 15/10* (2011.01)
*G06T 15/50* (2011.01)

(52) U.S. Cl.
CPC .............. *G06T 15/10* (2013.01); *G06T 15/50* (2013.01)

(58) Field of Classification Search
CPC ....... G06T 15/50; G06T 15/04; G06T 15/506; G06T 15/10
See application file for complete search history.

(56) References Cited

U.S. PATENT DOCUMENTS 5,459,797 A * 10/1995 Sato ................... G06V 30/1444
358/518
2007/0139408 A1 6/2007 Keranen
(Continued)

FOREIGN PATENT DOCUMENTS

CN       102737404 A  * 10/2012
CN       106652007 A     5/2017
(Continued)

OTHER PUBLICATIONS

Bojian et al., "Survey on 3D Reconstruction of Transparent Objects," Journal of Computer-Aided Design & Computer Graphics, Feb. 2020, vol. 32, No. 2, English translation of Abstract only (8 pages).
(Continued)

*Primary Examiner* — Kee M Tung
*Assistant Examiner* — Nauman U Ahmad

(57) ABSTRACT

There is provided a solution for rendering a transparent polyhedron. In a method, obtaining reflected light colors of respective positions on a back face of the transparent polyhedron; sampling on a background image or an ambient map according to the refracted light directions of respective positions on the back face to obtain refracted light colors; obtaining colors of respective positions on the back face according to the reflected light colors and the refracted light colors of respective positions on the back face; obtaining colors of respective positions on a front face of the transparent polyhedron; weighted-mixing the colors of respective positions on the back face and the colors of respective positions on the front face according to a first weighting coefficient to obtain rendering colors of respective positions
(Continued)

of the transparent polyhedron; rendering the transparent polyhedron according to the rendering colors of respective positions of the transparent polyhedron.

17 Claims, 6 Drawing Sheets

(56)                References Cited

U.S. PATENT DOCUMENTS

| | | | | |
|---|---|---|---|---|
| 2011/0026053 | A1* | 2/2011 | Gil | H04N 1/6052 |
| | | | | 358/1.9 |
| 2011/0191334 | A1* | 8/2011 | Hua | G06F 16/532 |
| | | | | 707/726 |
| 2013/0063629 | A1* | 3/2013 | Webster | G02B 27/1013 |
| | | | | 348/265 |
| 2017/0034519 | A1* | 2/2017 | Rosewarne | H04N 19/85 |

| | | | | | |
|---|---|---|---|---|---|
| 2018/0033191 | A1* | 2/2018 | Mendez | | G06T 15/506 |
| 2018/0315245 | A1* | 11/2018 | Patel | | G06T 15/50 |
| 2021/0225076 | A1* | 7/2021 | Ratkovic | | G06T 15/50 |

FOREIGN PATENT DOCUMENTS

| | | | | | |
|---|---|---|---|---|---|
| CN | 111899325 | A | | 11/2020 | |
| CN | 112200902 | A | * | 1/2021 | G06T 15/205 |
| JP | H06302208 | A | | 10/1994 | |
| JP | 2006318438 | A | | 11/2006 | |

OTHER PUBLICATIONS

Unity3D tutorial How to use Shader to achieve diamond rendering effects, Oct. 21, 2016, https://gwb.tencent.com/community/detail/110022, English translation (16 pages).

First Office Action mailed Mar. 25, 2026, in Japanese Application No. 202110875234.0.

* cited by examiner

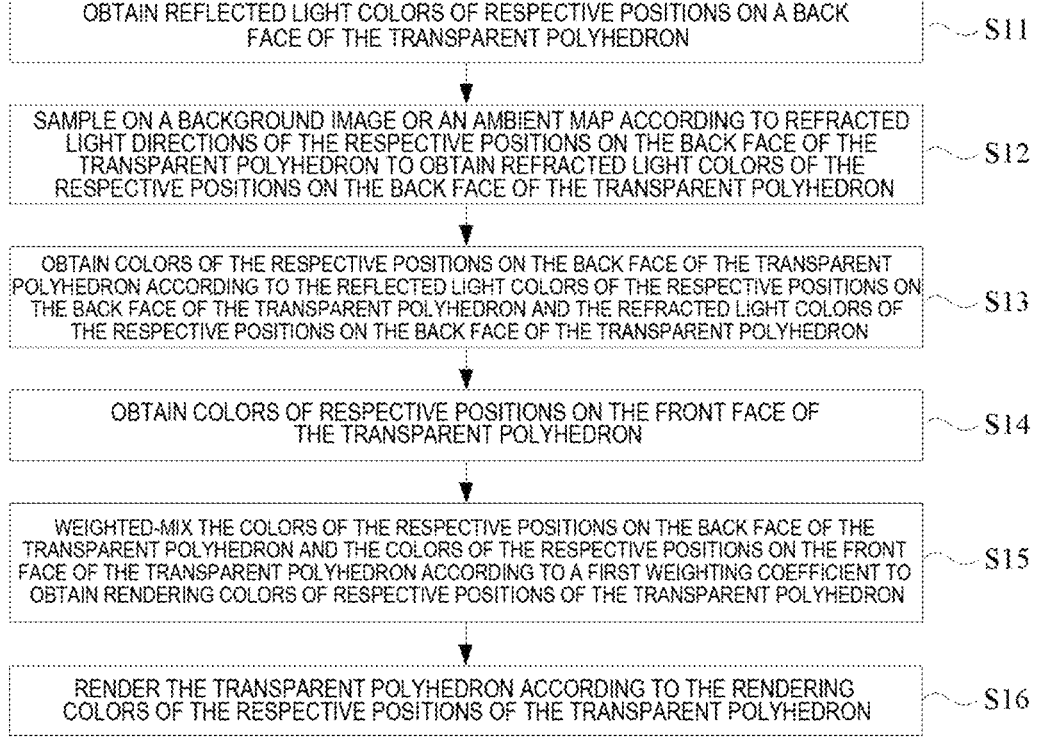

OBTAIN REFLECTED LIGHT COLORS OF RESPECTIVE POSITIONS ON A BACK FACE OF THE TRANSPARENT POLYHEDRON  ~ S11

SAMPLE ON A BACKGROUND IMAGE OR AN AMBIENT MAP ACCORDING TO REFRACTED LIGHT DIRECTIONS OF THE RESPECTIVE POSITIONS ON THE BACK FACE OF THE TRANSPARENT POLYHEDRON TO OBTAIN REFRACTED LIGHT COLORS OF THE RESPECTIVE POSITIONS ON THE BACK FACE OF THE TRANSPARENT POLYHEDRON  ~ S12

OBTAIN COLORS OF THE RESPECTIVE POSITIONS ON THE BACK FACE OF THE TRANSPARENT POLYHEDRON ACCORDING TO THE REFLECTED LIGHT COLORS OF THE RESPECTIVE POSITIONS ON THE BACK FACE OF THE TRANSPARENT POLYHEDRON AND THE REFRACTED LIGHT COLORS OF THE RESPECTIVE POSITIONS ON THE BACK FACE OF THE TRANSPARENT POLYHEDRON  ~ S13

OBTAIN COLORS OF RESPECTIVE POSITIONS ON THE FRONT FACE OF THE TRANSPARENT POLYHEDRON  ~ S14

WEIGHTED-MIX THE COLORS OF THE RESPECTIVE POSITIONS ON THE BACK FACE OF THE TRANSPARENT POLYHEDRON AND THE COLORS OF THE RESPECTIVE POSITIONS ON THE FRONT FACE OF THE TRANSPARENT POLYHEDRON ACCORDING TO A FIRST WEIGHTING COEFFICIENT TO OBTAIN RENDERING COLORS OF RESPECTIVE POSITIONS OF THE TRANSPARENT POLYHEDRON  ~ S15

RENDER THE TRANSPARENT POLYHEDRON ACCORDING TO THE RENDERING COLORS OF THE RESPECTIVE POSITIONS OF THE TRANSPARENT POLYHEDRON  ~ S16

METHOD AND APPARATUS FOR RENDERING TRANSPARENT POLYHEDRON

CROSS-REFERENCE TO RELATED APPLICATION(S)

This disclosure claims the priority to Chinese patent application No. 202110875234.0 entitled "METHOD AND APPARATUS FOR RENDERING TRANSPARENT POLY-HEDRON" filed on Jul. 30, 2021, the disclosures of which are incorporated herein by reference at least in part.

FIELD

The invention relates to the technical field of image rendering, and in particular, to a method and apparatus for rendering a transparent polyhedron.

BACKGROUND

Augmented Reality (AR) technology is a technology used to integrate virtual information and the real world. It can perform simulation processing to entity information based on computer and other science and technology, which would otherwise be difficult to experience in the spatial scope of the real world. Therefore, virtual information content may be superimposed in the real world, and the sensory experience beyond reality may be achieved.

SUMMARY

In view of this, embodiments of the present invention provide a method and apparatus for rendering a transparent polyhedron. The technical solution provided herein is as follows:

In a first aspect, the embodiments of the present invention provide a method of rendering a transparent polyhedron, the method comprising:

obtaining reflected light colors of respective positions on a back face of the transparent polyhedron;

sampling on a background image or an ambient map according to refracted light directions of the respective positions on the back face of the transparent polyhedron to obtain refracted light colors of the respective positions on the back face of the transparent polyhedron, the background image being an image obtained through image collection in a real scene, and the background image being opposite to the back face of the transparent polyhedron;

obtaining colors of the respective positions on the back face of the transparent polyhedron according to the reflected light colors of the respective positions on the back face of the transparent polyhedron and the refracted light colors of the respective positions on the back face of the transparent polyhedron;

obtaining colors of respective positions on the front face of the transparent polyhedron;

weighted-mixing the colors of the respective positions on the back face of the transparent polyhedron and the colors of the respective positions on the front face of the transparent polyhedron according to a first weighting coefficient to obtain rendering colors of respective positions of the transparent polyhedron;

rendering the transparent polyhedron according to the rendering colors of the respective positions of the transparent polyhedron.

2

As an optional implementation of the embodiments of the present invention, the obtaining the reflected light colors of the respective positions on the back face of the transparent polyhedron comprises:

sampling on a contrast control map according to coordinates of the respective positions on the back face of the transparent polyhedron to obtain first color components of the respective positions on the back face of the transparent polyhedron;

sampling on an internal rendering effect map according to the reflected light directions of the respective positions on the back face of the transparent polyhedron to obtain second color components of the respective positions on the back face of the transparent polyhedron;

obtaining an outer product of the first color components and the second color components of the respective positions on the back face of the transparent polyhedron as the reflected light colors of the respective positions on the back face of the transparent polyhedron.

As an optional implementation of the embodiments of the present invention, the obtaining the colors of the respective positions on the back face of the transparent polyhedron according to the reflected light colors of the respective positions on the back face of the transparent polyhedron and the refracted light colors of the respective positions on the back face of the transparent polyhedron comprises:

weighted-mixing the reflected light colors of the respective positions on the back face of the transparent polyhedron and the refracted light colors of the respective positions on the back face of the transparent polyhedron according to a Fresnel coefficient to obtain the colors of the respective positions on the back face of the transparent polyhedron.

As an optional implementation of the embodiments of the present invention, the obtaining the colors of the respective positions on the front face of the transparent polyhedron comprises:

obtaining reflected light colors of the respective positions on the front face of the transparent polyhedron;

obtaining refracted light colors of the respective positions on the front face of the transparent polyhedron;

obtaining colors of the respective positions on the front face of the transparent polyhedron according to the reflected light colors of the respective positions on the front face of the transparent polyhedron and the refracted light colors of the respective positions on the front face of the transparent polyhedron.

As an optional implementation of the embodiments of the present invention, the obtaining the reflected light colors of the respective positions on the front face of the transparent polyhedron comprises:

sampling on a dispersion map according to the reflected light directions of the respective positions on the front face of the transparent polyhedron to obtain first color components of the respective positions on the front face of the transparent polyhedron;

obtaining second color components of the respective positions on the front face of the transparent polyhedron according to an ambient light source and the reflected light directions of the respective positions on the front face of the transparent polyhedron;

sampling on the ambient map according to the reflected light directions of the respective positions on the front face of the transparent polyhedron to obtain third color components of the respective positions on the front face of the transparent polyhedron;

obtaining fourth color components of the respective positions on the front face of the transparent polyhedron, the fourth color components of the respective positions on the front face of the transparent polyhedron being outer products of the first color components and the second color components;

weighted-mixing the first color components of the respective positions on the front face of the transparent polyhedron and the fourth color components of the respective positions on the front face of the transparent polyhedron according to second weighting coefficients to obtain fifth color components of the respective positions on the front face of the transparent polyhedron;

obtaining outer products of the fifth color components and the third color components of the respective positions on the front face of the transparent polyhedron as the reflected light colors of the respective positions on the front face of the transparent polyhedron.

As an optional implementation of the embodiments of the present invention, the obtaining the refracted light colors of the respective positions on the front face of the transparent polyhedron comprises:

sampling on the internal rendering effect map according to the refracted light directions of the respective positions on the front face of the transparent polyhedron to obtain the refracted light colors of the respective positions on the front face of the transparent polyhedron.

As an optional implementation of the embodiments of the present invention, the obtaining the colors of the respective positions on the front face of the transparent polyhedron according to the reflected light colors of the respective positions on the front face of the transparent polyhedron and the refracted light colors of the respective positions on the front face of the transparent polyhedron comprises:

weighted-mixing the reflected light colors of the respective positions on the front face of the transparent polyhedron and the refracted light colors of the respective positions on the front face of the transparent polyhedron according to the Fresnel coefficient to obtain the colors of the respective positions on the front face of the transparent polyhedron.

In a second aspect, the embodiments of the present invention provide an apparatus for rendering a transparent polyhedron, the apparatus comprising:

a reflected light color obtaining unit, for obtaining reflected light colors of respective positions on a back face of the transparent polyhedron;

a refracted light color obtaining unit, for sampling on a background image or an ambient map according to refracted light directions of the respective positions on the back face of the transparent polyhedron to obtain refracted light colors of the respective positions on the back face of the transparent polyhedron, the background image being an image obtained through image collection in a real scene, and the background image being opposite to the back face of the transparent polyhedron;

a first color obtaining unit, for obtaining colors of the respective positions on the back face of the transparent polyhedron according to the reflected light colors of the respective positions on the back face of the transparent polyhedron and the refracted light colors of the respective positions on the back face of the transparent polyhedron;

a second color obtaining unit, for obtaining colors of the respective positions on the front face of the transparent polyhedron;

a third color obtaining unit, for weighted-mixing the colors of the respective positions on the back face of the transparent polyhedron and the colors of the respective positions on the front face of the transparent polyhedron according to a first weighting coefficient to obtain rendering colors of the respective positions of the transparent polyhedron;

a rendering unit, for rendering the transparent polyhedron according to the rendering colors of the respective positions of the transparent polyhedron.

As an optional implementation of the embodiments of the present invention, the reflected light color obtaining unit is specifically for: sampling on a contrast control map according to coordinates of the respective positions on the back face of the transparent polyhedron to obtain first color components of the respective positions on the back face of the transparent polyhedron: sampling on an internal rendering effect map according to the reflected light directions of the respective positions on the back face of the transparent polyhedron to obtain second color components of the respective positions on the back face of the transparent polyhedron: obtaining an outer product of the first color components and the second color components of the respective positions on the back face of the transparent polyhedron as the reflected light colors of the respective positions on the back face of the transparent polyhedron.

As an optional implementation of the embodiments of the present invention, the first color obtaining unit is specifically for weighted-mixing the reflected light colors of the respective positions on the back face of the transparent polyhedron and the refracted light colors of the respective positions on the back face of the transparent polyhedron according to a Fresnel coefficient to obtain the colors of the respective positions on the back face of the transparent polyhedron.

As an optional implementation of the embodiments of the present invention, the second color obtaining unit is specifically for obtaining reflected light colors of the respective positions on the front face of the transparent polyhedron: obtaining refracted light colors of the respective positions on the front face of the transparent polyhedron; obtaining colors of the respective positions on the front face of the transparent polyhedron according to the reflected light colors of the respective positions on the front face of the transparent polyhedron and the refracted light colors of the respective positions on the front face of the transparent polyhedron.

As an optional implementation of the embodiments of the present invention, the second color obtaining unit is specifically for: sampling on a dispersion map according to the reflected light directions of the respective positions on the front face of the transparent polyhedron to obtain first color components of the respective positions on the front face of the transparent polyhedron: obtaining second color components of the respective positions on the front face of the transparent polyhedron according to an ambient light source and the reflected light directions of the respective positions on the front face of the transparent polyhedron: sampling on the ambient map according to the reflected light directions of the respective positions on the front face of the transparent polyhedron to obtain third color components of the respective positions on the front face of the transparent polyhedron: obtaining fourth color components of the respective positions on the front face of the transparent polyhedron, the fourth color components of the respective positions on the front face of the transparent polyhedron being outer products of the first color components and the second color components: weighted-mixing the first color components of the respective positions on the front face of the transparent polyhedron and the fourth color components of the respective positions on the front face of the transparent polyhedron according to second weighting coefficients to obtain fifth color components of the respective positions on the front face of the transparent polyhedron: obtaining outer products of the fifth color components and the third color components of the respective positions on the front face of the transparent polyhedron as the reflected light colors of the respective positions on the front face of the transparent polyhedron.

As an optional implementation of the embodiments of the present invention, the second color obtaining unit is specifically for sampling on the internal rendering effect map according to the refracted light directions of the respective positions on the front face of the transparent polyhedron to obtain the refracted light colors of the respective positions on the front face of the transparent polyhedron.

As an optional implementation of the embodiments of the present invention, the second color obtaining unit is specifically for weighted-mixing the reflected light colors of the respective positions on the front face of the transparent polyhedron and the refracted light colors of the respective positions on the front face of the transparent polyhedron according to the Fresnel coefficient to obtain the colors of the respective positions on the front face of the transparent polyhedron.

In a third aspect, the embodiments of the present invention provide an electronic device, which comprises: a memory and a processor, the memory being used to store a computer program: the processor is used to, when calling the computer program, cause the electronic device to perform a method of rendering a transparent polyhedron as described in any of the foregoing embodiments.

In a fourth aspect, the embodiments of the present invention provide a computer-readable storage medium on which a computer program is stored, the computer program, when executed by a computing device, causing the computing device to perform a method of rendering a transparent polyhedron as described in any of the foregoing embodiments.

In a fifth aspect, the embodiments of the present invention provide a computer program product which, when running on a computer, causes the computer to perform the method of rendering a transparent polyhedron as described in any of the foregoing embodiments.

BRIEF DESCRIPTION OF THE DRAWINGS

The drawings herein are incorporated into the specification and form part of the specification, which illustrate embodiments conforming to the present invention and are used together with the specification to explain the principle of the present invention.

In order to more clearly describe the technical solution in the embodiments of the present invention or the prior art, a brief introduction is presented below to the drawings to be used in the description of the embodiments or the prior art. It is obvious that those of ordinary skill in the art may further obtain other drawings according to these drawings without the exercise of any inventive skill.

FIG. 1 is a flowchart of steps of a method of rendering a transparent polyhedron provided by the embodiments of the present invention;

DETAILED DESCRIPTION OF EMBODIMENTS

Figure 2:
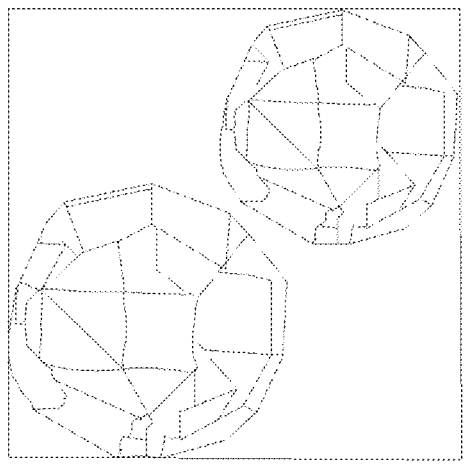
FIG. 2 is a schematic diagram of a contrast control map provided by the embodiments of the present invention.

In order to understand the above objectives, features and advantages of the present invention more clearly, the solution of the present invention is further described below. It is noteworthy that the embodiments of the present invention and the features in the embodiments may be combined with each other without conflict.

Many specific details are set forth in the description below to facilitate a full understanding of the present invention, whereas the present invention may further be implemented in ways other than those described herein. Obviously, the embodiments in the specification are only part rather than all of the embodiments of the present invention.

In the embodiments of the present invention, the words "as an example" or "for example" and the like are used to indicate an example, an illustrative example, or illustration. Any embodiment or design described with "as an example" or "for example" in the embodiments of the present invention shall not be construed as preferable or superior to other embodiments or designs. Rather, the use of words such as "as an example" or "for example" is intended to present relevant concepts in a concrete manner. Furthermore, in the description of the embodiments of the present invention, "multiple" means two or more unless otherwise stated.

The transparent polyhedra in the embodiments of the present invention may also be diamonds, prisms, glass fragments, etc. The following embodiments take the diamond as an example of the transparent polyhedra to illustrate the method of rendering transparent polyhedra as provided in the embodiments of the invention, whereas the embodiments of the present invention are not limited herein.

In the real world, since the final visual effect of transparent polyhedra is affected not only by the reflection of light on its various faces, the refraction and scattering of light by the polyhedra but also by the light they transmit, transparent polyhedra such as diamonds, prisms and glass fragments usually show a high degree of visual complexity. In order to simplify the rendering of transparent polyhedra in AR scenes, the influence of AR scenes on the final color presented by transparent polyhedra is generally ignored in the prior art, and the transparent polyhedra are rendered based on the preset visual effect. Although the approach to rendering transparent polyhedra in the prior art may also cause transparent polyhedra such as diamonds, prisms and glass fragments to exhibit a high degree of visual complexity by complicating the preset visual effects, the presented visual effects cannot be adapted according to the AR scene, and the sense of reality is poor.

Based on the above problems in the prior art, the embodiments of the present invention provide a method of rendering a transparent polyhedron. As shown in FIG. 1, the method of rendering a transparent polyhedron comprises the following steps:

S11: obtaining reflected light colors of respective positions on a back face of the transparent polyhedron.

Specifically, in the embodiments of the present invention, the back face of a transparent polyhedron may refer to a face among multiple faces of the transparent polyhedron which is oriented at an angle of less than 90° from the direction of observation. Herein, the orientation of any face of the transparent polyhedron is perpendicular to the face and away from the rays of the transparent polyhedron; and the observation direction is the shooting direction of a virtual camera.

It is noteworthy that the shooting direction of the virtual camera might change when rendering different image frames. Therefore, the face back of the transparent polyhedron may also change accordingly for different image frames.

Optionally, one implementation of step S11 (obtaining reflected light colors of respective positions on a back face of the transparent polyhedron) may comprise steps 11a to 11c:

Step 11a: sampling on a contrast control map according to coordinates of the respective positions on the back face of the transparent polyhedron to obtain first color components of the respective positions on the back face of the transparent polyhedron.

The contrast control map in the embodiments of the present invention is a preset color sampling map. As an example, with reference to FIG. 2, this figure shows a schematic diagram of a contrast control map provided by the embodiments of the present invention. In order to enhance the visual complexity of the transparent polyhedron, the contrast control map may comprise multiple irregularly arranged regions with different contrasts.

Specifically, the sampling on a contrast control map according to coordinates of the respective positions on the back face of the transparent polyhedron to obtain first color components of the respective positions on the back face of the transparent polyhedron may be as follows: for a position with coordinates (x, y) on the back face of the transparent polyhedron, sampling a color value at coordinates (x, y) in the contrast control map as the first color component of the position.

Step 11b: sampling on an internal rendering effect map according to the reflected light directions of the respective positions on the back face of the transparent polyhedron to obtain second color components of the respective positions on the back face of the transparent polyhedron.

The internal rendering effect map in the embodiments of the present invention is a preset color sampling mapping, which may be produced and obtained by drawing software.

Figure 3:
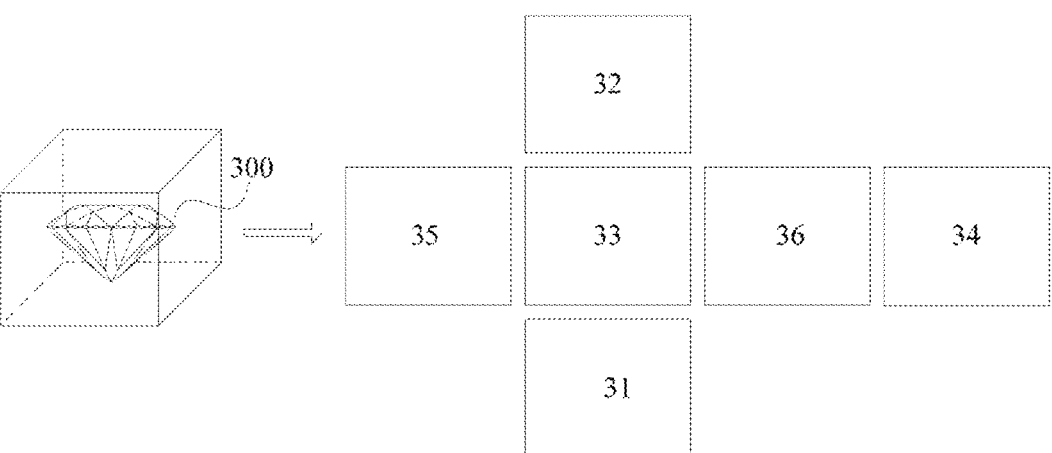
FIG. 3 is a schematic diagram of an internal rendering effect map provided by the embodiments of the present invention.

As an example, with reference to a structural schematic diagram and expansion diagram of the internal rendering effect map in FIG. 3, the internal rendering effect map may comprise: a first internal rendering effect map 31 located on the front side of the transparent polyhedron 300, a second internal rendering effect map 32 located on the back side of the transparent polyhedron 300, a third internal rendering effect map 33 located on the bottom side of the transparent polyhedron 300, a fourth internal rendering effect map 34 located on the top side of the transparent polyhedron 300, a fifth internal rendering effect map 35 located on the left side of the transparent polyhedron 300 and a sixth internal rendering effect map 36 located on the right side of the transparent polyhedron 300, wherein the first internal rendering effect map 31, the second internal rendering effect map 32, the third internal rendering effect map 33, the fourth internal rendering effect map 34, the fifth internal rendering effect map 35 and the sixth internal rendering effect map 36 are enclosed to form a closed cube space, and the transparent polyhedron 300 is located inside the closed cube space formed by the internal rendering effect maps.

Specifically, the sampling in an internal rendering effect map according to the direction of reflected light at respective positions on the back face of the transparent polyhedron may comprise: extending away from the transparent polyhedron in the directions of reflected light at respective positions on the back face of the transparent polyhedron, sampling at positions where the directions of reflected light intersect with the internal rendering effect map, and using sampling results as the second color components of respective positions on the back face of the transparent polyhedron.

Step 11c: obtaining an outer product of the first color components and the second color components of the respective positions on the back face of the transparent polyhedron as the reflected light colors of the respective positions on the back face of the transparent polyhedron.

Suppose: the first color component of each position on the back face of the transparent polyhedron is $\vec{A_{ij}}$, the second color component of the position on the back face of the transparent polyhedron is $\vec{B_{ij}}$, and the reflected light color of the position on the back face of the transparent polyhedron is $\vec{C_{ij}}$, then $\vec{C_{ij}} = \vec{A_{ij}} \times \vec{B_{ij}}$.

That is, based on the Multiply mode, the first color component and the second color component of each position on the back face of the transparent polyhedron are mixed, and a mixing result is taken as the reflected light color of each position on the back face of the transparent polyhedron.

S12: sampling on a background image or an ambient map according to refracted light directions of the respective positions on the back face of the transparent polyhedron to obtain refracted light colors of the respective positions on the back face of the transparent polyhedron.

Herein the background image is an image obtained through image collection in a real scene, and the background image being opposite to the back face of the transparent polyhedron.

Figure 4:
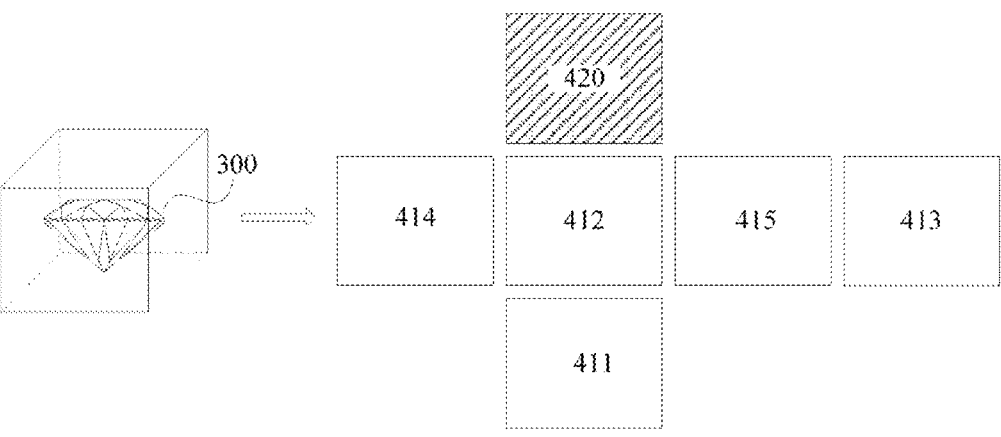
FIG. 4 is a schematic diagram of an ambient map provided by the embodiments of the present invention.

The ambient map in the embodiments of the present invention is a preset color sampling map, which is used to simulate information such as light intensity; light source distribution, light color and so on in the environment of the transparent polyhedron. As an example, with reference to FIG. 4, the ambient map may comprise: a first ambient map 411 located on the front side of the transparent polyhedron 300, a second ambient map 412 located on the bottom side of the transparent polyhedron 300, a third ambient map 413 located on the top side of the transparent polyhedron 300, a fourth ambient map 414 located on the left side of the transparent polyhedron 300 and a fifth ambient map 415 located on the right side of the transparent polyhedron 300, wherein the first ambient map 411, the second ambient map 412, the third ambient map 413, the fourth ambient map 414, the fifth ambient map 415 and a background image 420 are enclosed to form a closed cube space, and the transparent polyhedron 300 is located inside the closed cube space formed by the ambient maps.

Specifically, sampling on a background image or an ambient map according to refracted light directions of the respective positions on the back face of the transparent polyhedron to obtain refracted light colors of the respective positions on the back face of the transparent polyhedron may comprise: obtaining the refraction direction according to the normal and observation direction: obtaining offset coordinates by offsetting coordinates of respective positions on the back face of the transparent polyhedron in a screen space according to the coordinates of respective positions on the back face of the transparent polyhedron in the screen space: determining the sampling mapping according to an offset coordinate position to obtain the refraction light color of the position, that is, sampling the ambient map or the background image. For example, if the offset coordinates of a position are within the ambient map, it indicates that the light source of the refracted light of this position is within the ambient map, so the ambient map is sampled according to the offset coordinates to obtain the refracted light color of this position: if the offset coordinates of a position are within the background image, it indicates that the light source of the refracted light of this position is within the background image, so the background image is sampled according to the offset coordinates to obtain the refracted light color of the position.

S13: obtaining colors of the respective positions on the back face of the transparent polyhedron according to the reflected light colors of the respective positions on the back face of the transparent polyhedron and the refracted light colors of the respective positions on the back face of the transparent polyhedron.

Optionally, the above step S13 (sampling on a background image or an ambient map according to refracted light directions of the respective positions on the back face of the transparent polyhedron to obtain refracted light colors of the respective positions on the back face of the transparent polyhedron) comprises:

weighted-mixing the reflected light colors of the respective positions on the back face of the transparent polyhedron and the refracted light colors of the respective positions on the back face of the transparent polyhedron according to the Fresnel coefficients to obtain the colors of respective positions on the back face of the transparent polyhedron.

Figure 5:
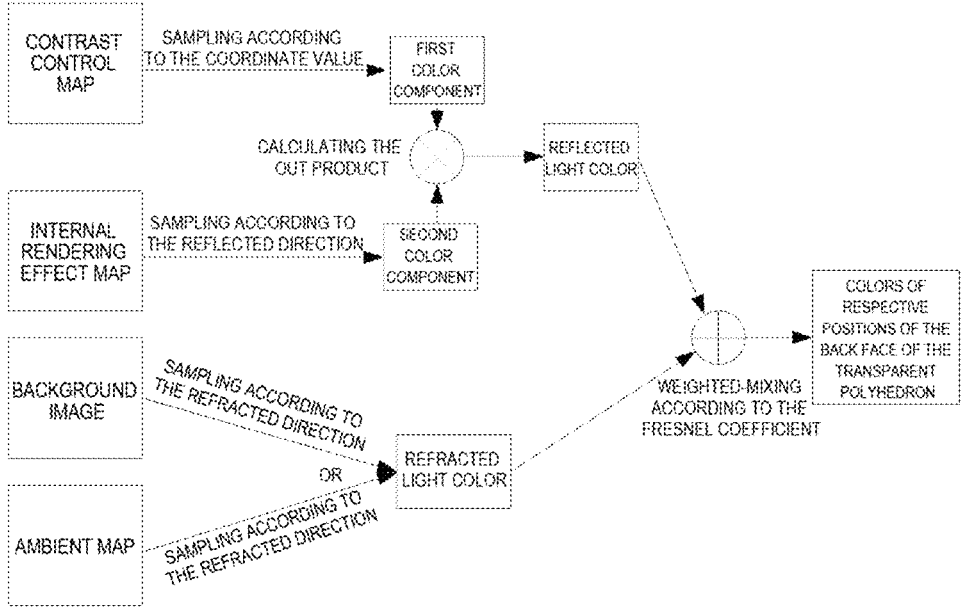
FIG. 5 is a schematic diagram of the process of obtaining the colors of respective positions on the back face of the transparent polyhedron provided by the embodiments of the present invention.

In summary, as shown in FIG. 5, the implementation process of obtaining the colors of the respective positions on the back face of the transparent polyhedron comprises steps 1 to 5 as follows:

Step 1: sampling on a contrast control map according to coordinates of the respective positions on the back face of the transparent polyhedron to obtain first color components of the respective positions on the back face of the transparent polyhedron.

Step 2: sampling on an internal rendering effect map according to the reflected light directions of the respective positions on the back face of the transparent polyhedron to obtain second color components of the respective positions on the back face of the transparent polyhedron.

Step 3: obtaining an outer product of the first color components and the second color components of the respective positions on the back face of the transparent polyhedron as the reflected light colors of the respective positions on the back face of the transparent polyhedron.

Step 4: sampling on a background image or ambient map according to the directions of refracted lights of the respective positions on the back face of the transparent polyhedron, to obtain the refracted light colors of respective positions on the back face of the transparent polyhedron.

Step 5: weighted-mixing the reflected light colors and the refracted light colors of the respective positions on the back face of the transparent polyhedron according to the Fresnel coefficient to obtain the colors of respective positions on the back face of the transparent polyhedron.

S14: obtaining the colors of the respective positions on the front face of the transparent polyhedron.

Specifically, the front face of a transparent polyhedron in the embodiments of the present invention refers to a face among faces of the transparent polyhedron which is oriented at an angle of more than 90° from the direction of observation.

As an optional implementation of the embodiments of the present invention, the above step S14 (obtaining the colors of the respective positions on the front face of the transparent polyhedron) comprises steps 14a to 14c as follows:

Step 14a: obtaining reflected light colors of the respective positions on the front face of the transparent polyhedron.

Optionally, implementation of obtaining reflected light colors of the respective positions on the front face of the transparent polyhedron comprise steps a to f as below:

Step a: sampling on a dispersion map according to the directions of reflected lights of respective positions on the front face of the transparent polyhedron, to obtain first color components of the respective positions on the front face of the transparent polyhedron.

Figure 6:
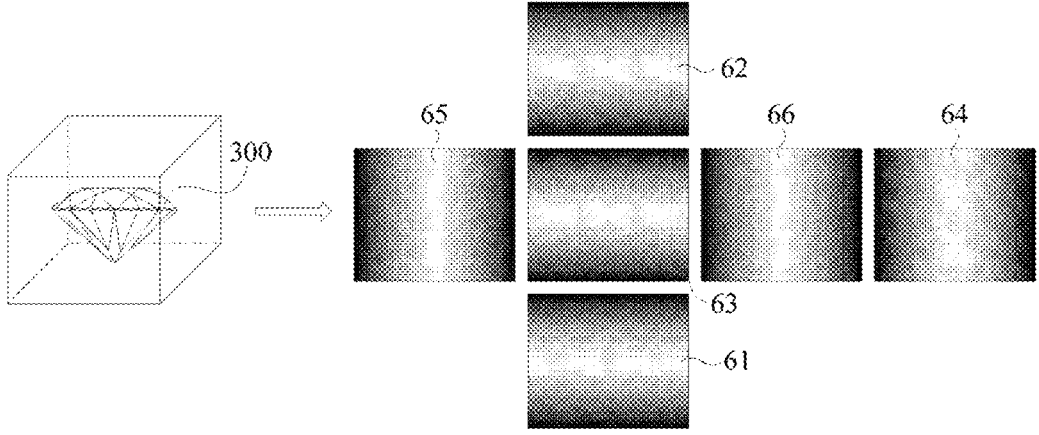
FIG. 6 is a schematic diagram of a dispersion map provided by the embodiments of the present invention.

The dispersion map in the embodiments of the present invention is a preset color sampling mapping. As an example, with reference to a structural schematic diagram and expansion diagram of the dispersion map in FIG. 6, the dispersion map may comprise: a first dispersion map 61 located on the front side of the transparent polyhedron 300, a second dispersion map 62 located on the back side of the transparent polyhedron 300, a third dispersion map 63 located on the bottom side of the transparent polyhedron 300, a fourth dispersion map 64 located on the top side of the transparent polyhedron 300, a fifth dispersion map 65 located on the left side of the transparent polyhedron 300 and a sixth dispersion map 66 located on the right side of the transparent polyhedron 300, wherein the first dispersion map 61, the second dispersion map 62, the third dispersion map 63, the fourth dispersion map 64, the fifth dispersion map 65 and the sixth dispersion map 66 are enclosed to form a closed cube space, and the transparent polyhedron 300 is located inside the closed cube space formed by the dispersion maps.

Specifically, the sampling on a dispersion map according to the directions of reflected lights at the respective positions on the front face of the transparent polyhedron may comprise: extending away from the transparent polyhedron in the directions of reflected lights at the respective positions on the front face of the transparent polyhedron, sampling at positions where the direction of reflected lights intersect with the dispersion map, and using sampling results as the second color components of the respective positions on the front face of the transparent polyhedron.

Step b: obtaining the second color components of the respective positions on the front face of the transparent polyhedron according to an ambient light source and the directions of reflected lights of the respective positions on the front face of the transparent polyhedron.

The ambient light source in the embodiments of the present invention refers to the light source obtained by considering each pixel point in the ambient map as a light source. In a rendering equation, the ambient light source may effectively capture the global illumination and atmosphere of the environment, so that the object can better integrate into its environment. In actual use, the ambient light source may be obtained through feature extraction of the ambient map using a convolutional neural network. Since the ambient map is preset, the ambient light source may be preset and used directly during rendering.

Step c: sampling on the ambient map according to the directions of reflected lights of the respective positions on the front face of the transparent polyhedron to obtain a third color component of respective positions on the front face of the transparent polyhedron.

Specifically, the ambient map used in obtaining the third color components of the respective positions on the front face of the transparent polyhedron is same as the ambient map used in obtaining the refracted light colors of the respective positions on the back face of the transparent polyhedron, so the implementation principle is also similar, which will not be repeated here.

Step d: obtaining fourth color components of the respective positions on the front face of the transparent polyhedron.

Herein, the fourth color components of the respective positions on the front face of the transparent polyhedron are outer products of the first color components and the second color components.

Suppose: the first color component of each position on the front face of the transparent polyhedron is $\overrightarrow{R_{ij}}$, the second color component of the position on the front face of the transparent polyhedron is $\overrightarrow{S_{ij}}$, and the fourth color component of the position on the front face of the transparent polyhedron is $\overrightarrow{F_{ij}}$, then $\overrightarrow{F_{ij}} = \overrightarrow{R_{ij}} \times \overrightarrow{S_{ij}}$.

Step e: weighted-mixing the first color components of the respective positions on the front face of the transparent polyhedron and the fourth color components of the respective positions on the front face of the transparent polyhedron according to a second weighting coefficient, to obtain fifth color components of the respective positions on the front face of the transparent polyhedron.

Suppose: the weighting coefficient of the first color component is a, the weighting coefficient of the fourth color component is b, the first color component of each position on the front face of the transparent polyhedron is $\overrightarrow{R_{ij}}$, the fourth color component of the position on the front face of the transparent polyhedron is $\overrightarrow{F_{ij}}$, the fifth color component of the position on the front face of the transparent polyhedron is $\overrightarrow{Q_{ij}}$, then $\overrightarrow{Q_{ij}} = a\overrightarrow{R_{ij}} + b\overrightarrow{F_{ij}}$.

Step f: obtaining outer products of the fifth color components of the respective positions on the front face of the transparent polyhedron and the third color components of the respective positions on the front face of the transparent polyhedron as the reflected light colors of respective positions of the front face of the transparent polyhedron.

Suppose: the third color component of each position on the front face of the transparent polyhedron is $\overrightarrow{T_{ij}}$, the fifth color component of the position on the front face of the transparent polyhedron is $\overrightarrow{Q_{ij}}$, the reflected light color of the position on the front face of the transparent polyhedron is $\overrightarrow{I_{ij}}$, then $$\overrightarrow{I_{ij}} = \overrightarrow{Q_{ij}} \times \overrightarrow{T_{ij}} = (a\overrightarrow{R_{ij}} + b\overrightarrow{F_{ij}}) \times \overrightarrow{T_{ij}}.$$

Step 14b: obtaining the refracted light colors of the respective positions on the front face of the transparent polyhedron.

Optionally, the implementation of obtaining the refracted light colors of respective positions on the front face of the transparent polyhedron may comprise:

sampling on the internal rendering effect map according to the directions of refracted lights of the respective positions on the front face of the transparent polyhedron to obtain the refracted light colors of respective positions on the front face of the transparent polyhedron.

Specifically, the internal rendering effect map used in obtaining the refracted light colors of the respective positions on the front face of the transparent polyhedron is the same as that used in obtaining the second color components of the respective positions on the back face of the transparent polyhedron, so the implementation principle is similar which will not be repeated here.

Step 14c: obtaining the colors of respective positions on the front face of the transparent polyhedron according to the reflected light colors of the respective positions on the front face of the transparent polyhedron and the refracted light colors of the respective positions on the front face of the transparent polyhedron.

As an optional implementation of the embodiments of the present invention, the obtaining the colors of the respective positions on the front face of the transparent polyhedron according to the reflected light colors of the respective positions on the front face of the transparent polyhedron and the refracted light colors of the respective positions on the front face of the transparent polyhedron may comprise:

weighted-mixing the reflected light colors of the respective positions on the front face of the transparent polyhedron and the refracted light colors of respective positions on the front face of the transparent polyhedron according to the Fresnel coefficient, to obtain the colors of the respective positions on the front face of the transparent polyhedron.

Figure 7:
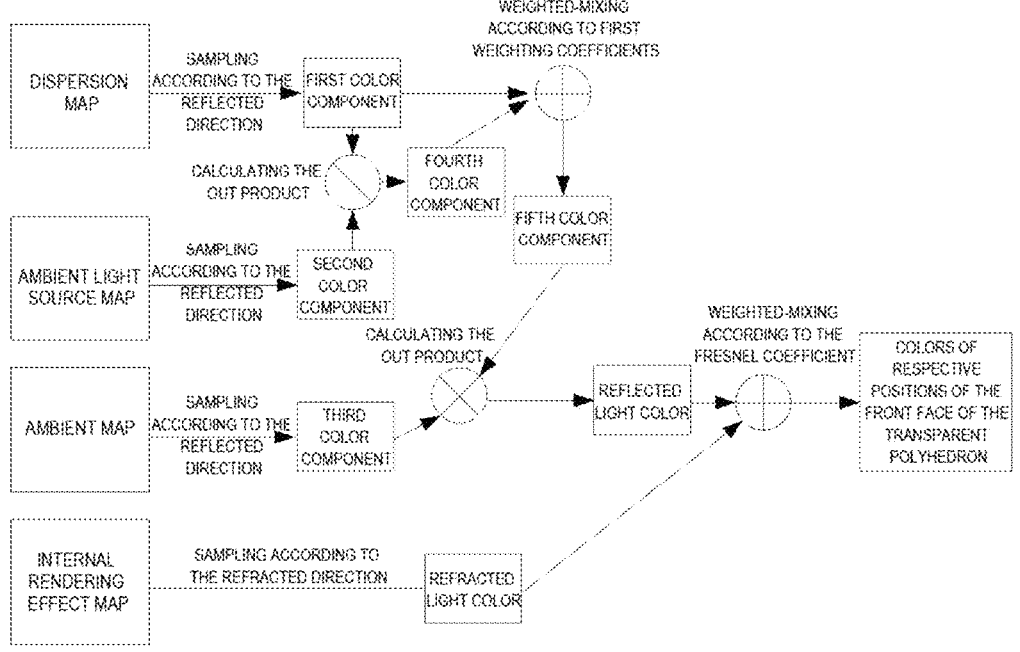
FIG. 7 is a schematic diagram of the process of obtaining the colors of respective positions on the front face of the transparent polyhedron provided by the embodiments of the present invention.

In summary, as shown in FIG. 7, the implementation process of obtaining the colors of respective positions on the front face of the transparent polyhedron comprises steps I to step VIII as follows:

Step I: sampling on a dispersion map according to the directions of reflected lights of the respective positions on the front face of the transparent polyhedron, to obtain first color components of the respective positions on the front face of the transparent polyhedron.

Step II: obtaining second color components of the respective positions on the front face of the transparent polyhedron according to an ambient light source and the directions of reflected lights of respective positions on the front face of the transparent polyhedron.

Step III: calculating outer products of the first color components and the second color components of the respective positions on the front face of the transparent polyhedron to obtain fourth color components of the respective positions on the front face of the transparent polyhedron.

Step IV: weighted-mixing the first color components and the fourth color components of the respective positions on the front face of the transparent polyhedron according to a second weighting coefficient, to obtain fifth color components of the respective positions on the front face of the transparent polyhedron.

Step V: sampling on the ambient map according to the directions of reflected lights of the respective positions on the front face of the transparent polyhedron to obtain third color components of the respective positions on the front face of the transparent polyhedron Step VI: calculating outer products of the fifth color components and the third color components of the respective positions on the front face of the transparent polyhedron to obtain the reflected light colors of respective positions of the front face of the transparent polyhedron.

Step VII: sampling on the internal rendering effect map according to the directions of refracted lights of respective positions on the front face of the transparent polyhedron to obtain the refracted light colors of respective positions on the front face of the transparent polyhedron.

Step VIII: weighted-mixing the reflected light colors and the refracted light colors of the respective positions on the front face of the transparent polyhedron according to the Fresnel coefficient, to obtain the colors of respective positions on the front face of the transparent polyhedron.

Returning to FIG. 1, in step S15, the colors of respective positions on the back face of the transparent polyhedron and the colors of the respective positions on the front face of the transparent polyhedron are weighted-mixed according to a second weighting coefficient, to obtain the rendering colors of respective positions of the transparent polyhedron.

Specifically; the colors of respective positions on the back face and the colors of the respective positions on the front face of the transparent polyhedron may be weighted-mixed with a preset weighting coefficient to obtain the rendering colors of respective positions of the transparent polyhedron.

Figure 8:
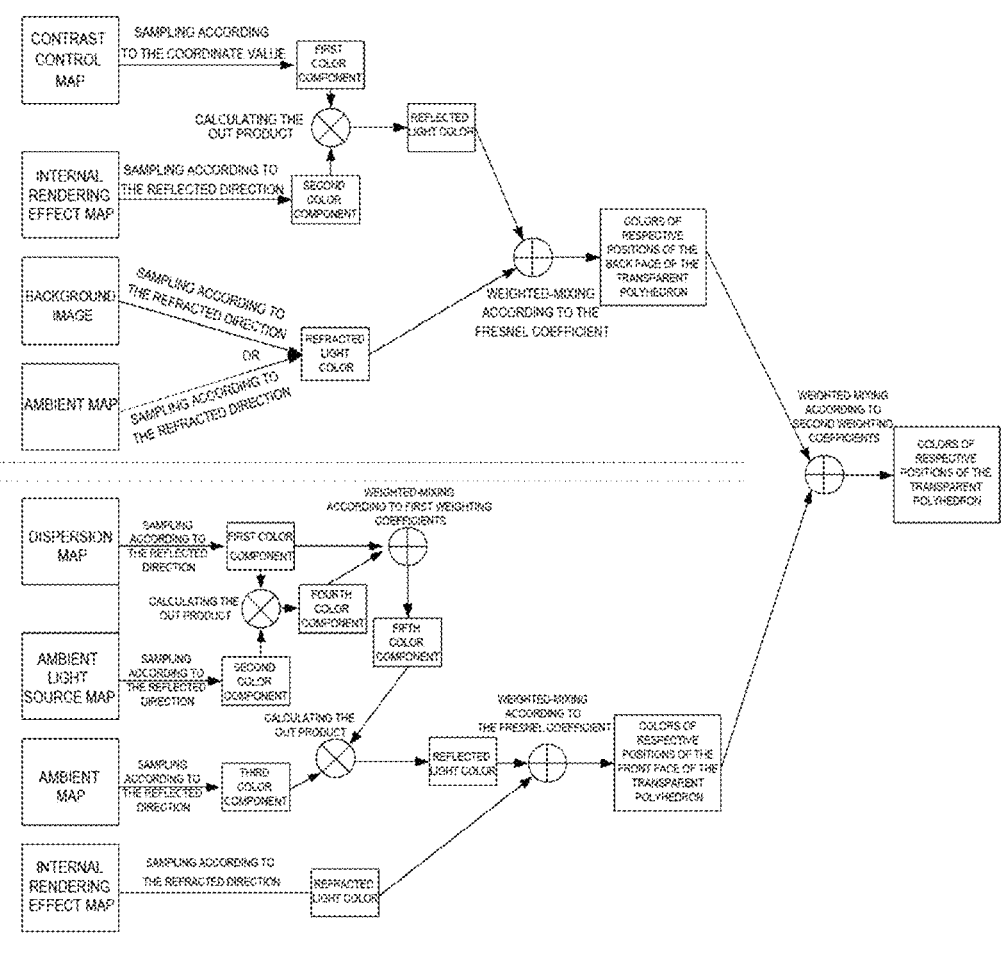
FIG. 8 is a schematic diagram of the process of obtaining the rendering colors of respective positions of the transparent polyhedron provided by the embodiments of the present invention.

In summary; as shown in FIG. 8, the implementation of obtaining the rendering colors of respective positions of the transparent polyhedron may comprise:

First, the colors of respective positions on the back face of the transparent polyhedron are obtained according to the flow steps shown in FIG. 5. Next, the colors of respective positions on the front face of the transparent polyhedron are obtained according to the flow steps shown in FIG. 7. Then, the colors of respective positions on the back face of the transparent polyhedron and the colors of respective positions on the front face of the transparent polyhedron are weighted-mixed to obtain the rendering colors of respective positions of the transparent polyhedron. The specific implementation principle is similar to that described above, which will not be repeated here.

Returning to FIG. 1, in step S16, the transparent polyhedron is rendered according to the rendering colors of respective positions of the transparent polyhedron.

With the method of rendering a transparent polyhedron provided by the embodiments of the present disclosure, when rendering the transparent polyhedron, first the reflected light colors of the respective positions on the back face of the transparent polyhedron are obtained. Next, a background image or an ambient map is sampled according to the refracted light directions of the respective positions on the back face of the transparent polyhedron to obtain the refracted light colors of the respective positions on the back face of the transparent polyhedron. Then, according to the reflected light colors and refracted light colors of the respective positions on the back face of the transparent polyhedron, the colors of the respective positions on the back face of the transparent polyhedron are obtained, and further the colors of the respective positions on the front face of the transparent polyhedron are obtained. Afterwards, the colors of respective positions on the back face and the colors of respective positions on the front face of the transparent polyhedron are weighted-mixed according to a first weighting coefficient to obtain the rendering colors of respective positions of the transparent polyhedron. Finally, the transparent polyhedron is rendered according to the rendering colors of respective positions of the transparent polyhedron. When rendering a transparent polyhedron, the method of rendering the transparent polyhedron provided by the embodiments of the present invention can obtain the refracted light colors of respective positions on the back face of the transparent polyhedron by sampling on the background image, which is obtained through image collection in the real scene, according to the refracted light directions of respective positions on the back face of the transparent polyhedron. Therefore, the visual effect of the transparent polyhedron rendered by the embodiments of the invention may be adapted to actual scenes, and the sense of reality of the transparent polyhedron may be improved.

Based on the same invention concept, as the implementation of the foregoing method, the embodiments of the present invention further provide an apparatus for rendering a transparent polyhedron. The apparatus embodiment corresponds to the method embodiment described above. For the sake of reading, the apparatus embodiment is not intended to repeat the details of the foregoing method embodiment one by one. However, it should be clear that the apparatus for rendering a transparent polyhedron in this embodiment can implement all the contents of the foregoing method embodiment.

Figure 9:
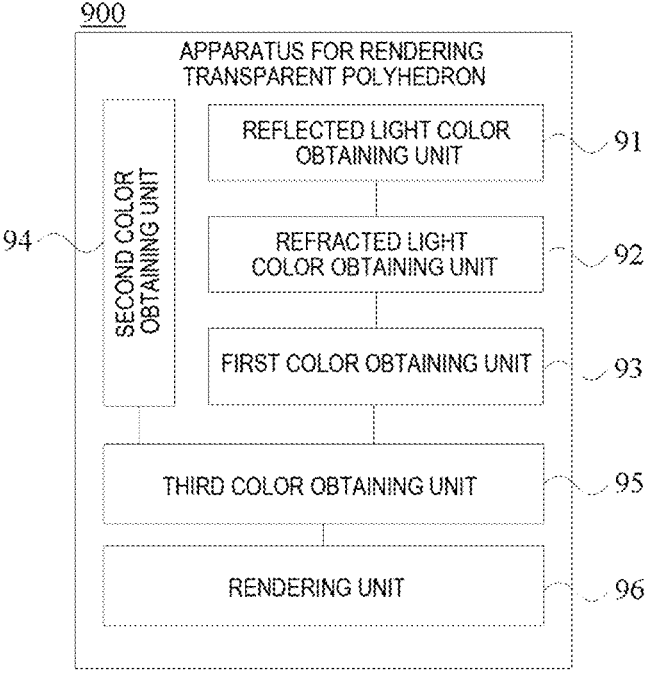
FIG. 9 is a structural schematic diagram of an apparatus for rendering a transparent polyhedron provided by the embodiments of the present invention.

The embodiments of the present invention provide an apparatus for rendering a transparent polyhedron. FIG. 9 is a schematic diagram of an apparatus for rendering a transparent polyhedron. As shown in FIG. 9, the apparatus 900 for rendering a transparent polyhedron comprises:

a reflected light color obtaining unit 91, for obtaining reflected light colors of respective positions on a back face of the transparent polyhedron;

a refracted light color obtaining unit 92, for sampling on a background image or an ambient map according to refracted light directions of the respective positions on the back face of the transparent polyhedron to obtain refracted light colors of the respective positions on the back face of the transparent polyhedron, the background image being an image obtained through image collection in a real scene, and the background image being opposite to the back face of the transparent polyhedron;

a first color obtaining unit 93, for obtaining colors of the respective positions on the back face of the transparent polyhedron according to the reflected light colors of the respective positions on the back face of the transparent polyhedron and the refracted light colors of the respective positions on the back face of the transparent polyhedron;

a second color obtaining unit 94, for obtaining colors of the respective positions on the front face of the transparent polyhedron;

a third color obtaining unit 95, for weighted-mixing the colors of the respective positions on the back face of the transparent polyhedron and the colors of the respective positions on the front face of the transparent polyhedron according to a first weighting coefficient to obtain rendering colors of the respective positions of the transparent polyhedron;

a rendering unit 96, for rendering the transparent polyhedron according to the rendering colors of the respective positions of the transparent polyhedron.

As an optional implementation of the embodiments of the present invention, the reflected light color obtaining unit 91 is specifically for: sampling on a contrast control map according to coordinates of the respective positions on the back face of the transparent polyhedron to obtain first color components of the respective positions on the back face of the transparent polyhedron: sampling on an internal rendering effect map according to the reflected light directions of the respective positions on the back face of the transparent polyhedron to obtain second color components of the respective positions on the back face of the transparent polyhedron: obtaining an outer product of the first color components and the second color components of the respective positions on the back face of the transparent polyhedron as the reflected light colors of the respective positions on the back face of the transparent polyhedron.

As an optional implementation of the embodiments of the present invention, the first color obtaining unit 93 is specifically for weighted-mixing the reflected light colors of the respective positions on the back face of the transparent polyhedron and the refracted light colors of the respective positions on the back face of the transparent polyhedron according to a Fresnel coefficient to obtain the colors of the respective positions on the back face of the transparent polyhedron.

As an optional implementation of the embodiments of the present invention, the second color obtaining unit 94 is specifically for obtaining reflected light colors of the respective positions on the front face of the transparent polyhedron: obtaining refracted light colors of the respective positions on the front face of the transparent polyhedron: obtaining colors of the respective positions on the front face of the transparent polyhedron according to the reflected light colors of the respective positions on the front face of the transparent polyhedron and the refracted light colors of the respective positions on the front face of the transparent polyhedron.

As an optional implementation of the embodiments of the present invention, the second color obtaining unit 94 is specifically for: sampling on a dispersion map according to the reflected light directions of the respective positions on the front face of the transparent polyhedron to obtain first color components of the respective positions on the front face of the transparent polyhedron: obtaining second color components of the respective positions on the front face of the transparent polyhedron according to an ambient light source and the reflected light directions of the respective positions on the front face of the transparent polyhedron: sampling on the ambient map according to the reflected light directions of the respective positions on the front face of the transparent polyhedron to obtain third color components of the respective positions on the front face of the transparent polyhedron: obtaining fourth color components of the respective positions on the front face of the transparent polyhedron, the fourth color components of the respective positions on the front face of the transparent polyhedron being outer products of the first color components and the second color components; weighted-mixing the first color components of the respective positions on the front face of the transparent polyhedron and the fourth color components of the respective positions on the front face of the transparent polyhedron according to second weighting coefficients to obtain fifth color components of the respective positions on the front face of the transparent polyhedron: obtaining outer products of the fifth color components and the third color components of the respective positions on the front face of the transparent polyhedron as the reflected light colors of the respective positions on the front face of the transparent polyhedron.

As an optional implementation of the embodiments of the present invention, the second color obtaining unit 94 is specifically for sampling on the internal rendering effect map according to the refracted light directions of the respective positions on the front face of the transparent polyhedron to obtain the refracted light colors of the respective positions on the front face of the transparent polyhedron.

As an optional implementation of the embodiments of the present invention, the second color obtaining unit 94 is specifically for weighted-mixing the reflected light colors of the respective positions on the front face of the transparent polyhedron and the refracted light colors of the respective positions on the front face of the transparent polyhedron according to the Fresnel coefficient to obtain the colors of the respective positions on the front face of the transparent polyhedron.

Figure 10:
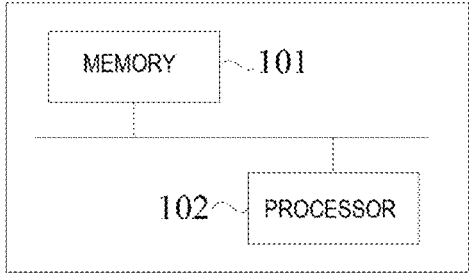
FIG. 10 is a schematic diagram of the hardware structure of an electronic device provided by the embodiments of the present invention.

Based on the same invention concept, the embodiments of the present invention further provide an electronic device. FIG. 10 is a structural schematic diagram of an electronic device provided by the embodiments of the present invention. As shown in FIG. 10, the electronic device provided herein comprises: a memory 101 and a processor 102. The memory 101 is used to store a computer program. The processor 102 is used to, when calling and executing the computer program, cause the electronic device to perform the method of rendering a transparent polyhedron provided by the foregoing embodiments.

The embodiments of the present invention further provide a computer readable storage medium on which a computer program is stored. The computer program, when executed by a computing device, causes the computing device to perform the method of rendering a transparent polyhedron provided by the foregoing embodiments.

The embodiments of the present invention further provide a computer program product which, when running on a computer, causes the computer to perform the method of rendering a transparent polyhedron provided by the foregoing embodiments.

Those skilled in the art should understand that the embodiments of present the invention may be provided as methods, systems, or computer program products. Therefore, the present invention may take the form of fully hardware embodiments, fully software embodiments, or embodiments combining software and hardware aspects. Furthermore, the present invention may take the form of a computer program product implemented on one or more computer usable storage media containing computer usable program code.

The processor may be a Central Processing Unit (CPU), or other general-purpose processor, Digital Signal Processor (DSP), Application Specific Integrated Circuit (ASIC), Field-Programmable gate Array (FPGA) or other programmable logic device, discrete gate or transistor logic device, discrete hardware component, etc. The general-purpose processor may be a microprocessor or the processor may be any conventional processor, etc.

The memory might include a volatile memory random access memory (RAM) and/or non-volatile memory and other form in computer readable media, such as read-only memory (ROM) or flash memory (flash RAM). The memory is an example of a computer readable medium.

Computer readable media include nonvolatile and volatile, removable and non-removable storage media. The storage medium may be used by any method or technology to achieve the storage of information, which can be computer-readable instructions, data structures, modules of programs, or other data. Examples of computer storage media include, but not limited to, phase-change random access memory (PRAM), static random access memory (SRAM), dynamic random access memory (DRAM), other types of random access memory (RAM), read-only memory (ROM), electrically erasable programmable read only memory (EE-PROM), flash memory or other memory technologies, CD-ROM read only memory (CD-ROM), digital multifunction optical disc (DVD) or other optical storage, magnetic cassette tape, disk storage or other magnetic storage device or any other non-transmission medium that may be used to store information accessible by a computing device. As defined herein, computer-readable media does not include transitory media, such as modulated data signals and carriers.

Finally, it should be noted that the above embodiments are used only to illustrate the technical solution of the present invention, rather than limiting. Notwithstanding the detailed description of the present invention by reference to the foregoing embodiments, it should be understood by those of ordinary skill in the art that modifications or equivalent replacements of some or all of the technical features thereof may still be made to the technical solution disclosed in the foregoing embodiments. Such modification or replacements shall not make the essence of the corresponding technical solution depart from the scope of the technical solution of the embodiments of the present invention.

We claim:

1. A method of rendering a transparent polyhedron, characterized by comprising: obtaining reflected light colors of respective positions on a back face of the transparent polyhedron; sampling on a background image or an ambient map according to refracted light directions of the respective positions on the back face of the transparent polyhedron to obtain refracted light colors of the respective positions on the back face of the transparent polyhedron, the background image being an image obtained through image collection in a real scene, and the background image being opposite to the back face of the transparent polyhedron; obtaining colors of the respective positions on the back face of the transparent polyhedron according to the reflected light colors of the respective positions on the back face of the transparent polyhedron and the refracted light colors of the respective positions on the back face of the transparent polyhedron; obtaining colors of respective positions on a front face of the transparent polyhedron; weighted-mixing the colors of the respective positions on the back face of the transparent polyhedron and the colors of the respective positions on the front face of the transparent polyhedron according to a first weighting coefficient to obtain rendering colors of respective positions of the transparent polyhedron; and rendering the transparent polyhedron according to the rendering colors of the respective positions of the transparent polyhedron, wherein the obtaining the reflected light colors of the respective positions on the back face of the transparent polyhedron comprises: sampling on a contrast control map according to coordinates of the respective positions on the back face of the transparent polyhedron to obtain first color components of the respective positions on the back face of the transparent polyhedron sampling on an internal rendering effect map according to reflected light directions of the respective positions on the back face of the transparent polyhedron to obtain second color components of the respective positions on the back face of the transparent polyhedron; and obtaining an outer product of the first color components and the second color components of the respective positions on the back face of the transparent polyhedron as the reflected light colors of the respective positions on the back face of the transparent polyhedron.

2. The method according to claim 1, characterized in that the obtaining the colors of the respective positions on the back face of the transparent polyhedron according to the reflected light colors of the respective positions on the back face of the transparent polyhedron and the refracted light colors of the respective positions on the back face of the transparent polyhedron comprises:

weighted-mixing the reflected light colors of the respective positions on the back face of the transparent polyhedron and the refracted light colors of the respective positions on the back face of the transparent polyhedron according to a Fresnel coefficient to obtain the colors of the respective positions on the back face of the transparent polyhedron.

3. The method according to claim 2, characterized in that the obtaining the colors of the respective positions on the front face of the transparent polyhedron comprises:

obtaining reflected light colors of the respective positions on the front face of the transparent polyhedron;

obtaining refracted light colors of the respective positions on the front face of the transparent polyhedron; and obtaining colors of the respective positions on the front face of the transparent polyhedron according to the reflected light colors of the respective positions on the front face of the transparent polyhedron and the refracted light colors of the respective positions on the front face of the transparent polyhedron.

4. The method according to claim 1, characterized in that the obtaining the colors of the respective positions on the front face of the transparent polyhedron comprises:

obtaining reflected light colors of the respective positions on the front face of the transparent polyhedron;

obtaining refracted light colors of the respective positions on the front face of the transparent polyhedron; and obtaining colors of the respective positions on the front face of the transparent polyhedron according to the reflected light colors of the respective positions on the front face of the transparent polyhedron and the refracted light colors of the respective positions on the front face of the transparent polyhedron.

5. The method according to claim 4, characterized in that the obtaining the reflected light colors of the respective positions on the front face of the transparent polyhedron comprises: sampling on a dispersion map according to the reflected light directions of the respective positions on the front face of the transparent polyhedron to obtain first color components of the respective positions on the front face of the transparent polyhedron; obtaining second color components of the respective positions on the front face of the transparent polyhedron according to an ambient light source and the reflected light directions of the respective positions on the front face of the transparent polyhedron; sampling on the ambient map according to the reflected light directions of the respective positions on the front face of the transparent polyhedron to obtain third color components of the respective positions on the front face of the transparent polyhedron; obtaining fourth color components of the respective positions on the front face of the transparent polyhedron, the fourth color components of the respective positions on the front face of the transparent polyhedron being outer products of the first color components and the second color components; weighted-mixing the first color components of the respective positions on the front face of the transparent polyhedron and the fourth color components of the respective positions on the front face of the transparent polyhedron according to second weighting coefficients to obtain fifth color components of the respective positions on the front face of the transparent polyhedron; and obtaining outer products of the fifth color components and the third color components of the respective positions on the front face of the transparent polyhedron as the reflected light colors of the respective positions on the front face of the transparent polyhedron.

6. The method according to claim 4, characterized in that the obtaining the refracted light colors of the respective positions on the front face of the transparent polyhedron comprises: sampling on the internal rendering effect map according to the refracted light directions of the respective positions on the front face of the transparent polyhedron to obtain the refracted light colors of the respective positions on the front face of the transparent polyhedron.

7. The method according to claim 4, characterized in that the obtaining the colors of the respective positions on the front face of the transparent polyhedron according to the reflected light colors of the respective positions on the front face of the transparent polyhedron and the refracted light colors of the respective positions on the front face of the transparent polyhedron comprises:

weighted-mixing the reflected light colors of the respective positions on the front face of the transparent polyhedron and the refracted light colors of the respective positions on the front face of the transparent polyhedron according to the Fresnel coefficient to obtain the colors of the respective positions on the front face of the transparent polyhedron.

8. The method according to claim 1, characterized in that the obtaining the colors of the respective positions on the front face of the transparent polyhedron comprises: obtaining reflected light colors of the respective positions on the front face of the transparent polyhedron; obtaining refracted light colors of the respective positions on the front face of the transparent polyhedron; and obtaining colors of the respective positions on the front face of the transparent polyhedron according to the reflected light colors of the respective positions on the front face of the transparent polyhedron and the refracted light colors of the respective positions on the front face of the transparent polyhedron.

9. An electronic device, characterized by comprising: a memory and a processor, the memory being used to store a computer program, the processor being used to, when calling the computer program, cause the electronic device to perform a method of rendering a transparent polyhedron, the method comprising: obtaining reflected light colors of respective positions on a back face of the transparent polyhedron; sampling on a background image or an ambient map according to refracted light directions of the respective positions on the back face of the transparent polyhedron to obtain refracted light colors of the respective positions on the back face of the transparent polyhedron, the background image being an image obtained through image collection in a real scene, and the background image being opposite to the back face of the transparent polyhedron; obtaining colors of the respective positions on the back face of the transparent polyhedron according to the reflected light colors of the respective positions on the back face of the transparent polyhedron and the refracted light colors of the respective positions on the back face of the transparent polyhedron; obtaining colors of respective positions on a front face of the transparent polyhedron; weighted-mixing the colors of the respective positions on the back face of the transparent polyhedron and the colors of the respective positions on the front face of the transparent polyhedron according to a first weighting coefficient to obtain rendering colors of respective positions of the transparent polyhedron; and rendering the transparent polyhedron according to the rendering colors of the respective positions of the transparent polyhedron, wherein the obtaining the reflected light colors of the respective positions on the back face of the transparent polyhedron comprises: sampling on a contrast control map according to coordinates of the respective positions on the back face of the transparent polyhedron to obtain first color components of the respective positions on the back face of the transparent polyhedron; sampling on an internal rendering effect map according to reflected light directions of the respective positions on the back face of the transparent polyhedron to obtain second color components of the respective positions on the back face of the transparent polyhedron; and obtaining an outer product of the first color components and the second color components of the respective positions on the back face of the transparent polyhedron as the reflected light colors of the respective positions on the back face of the transparent polyhedron.

10. The device according to claim 9, characterized in that the obtaining the colors of the respective positions on the back face of the transparent polyhedron according to the reflected light colors of the respective positions on the back face of the transparent polyhedron and the refracted light colors of the respective positions on the back face of the transparent polyhedron comprises:

weighted-mixing the reflected light colors of the respective positions on the back face of the transparent polyhedron and the refracted light colors of the respective positions on the back face of the transparent polyhedron according to a Fresnel coefficient to obtain the colors of the respective positions on the back face of the transparent polyhedron.

11. The device according to claim 10, characterized in that the obtaining the colors of the respective positions on the front face of the transparent polyhedron comprises:

obtaining reflected light colors of the respective positions on the front face of the transparent polyhedron;

obtaining refracted light colors of the respective positions on the front face of the transparent polyhedron; and obtaining colors of the respective positions on the front face of the transparent polyhedron according to the reflected light colors of the respective positions on the front face of the transparent polyhedron and the refracted light colors of the respective positions on the front face of the transparent polyhedron.

12. The device according to claim 9, characterized in that the obtaining the colors of the respective positions on the front face of the transparent polyhedron comprises:

obtaining reflected light colors of the respective positions on the front face of the transparent polyhedron;

obtaining refracted light colors of the respective positions on the front face of the transparent polyhedron; and obtaining colors of the respective positions on the front face of the transparent polyhedron according to the reflected light colors of the respective positions on the front face of the transparent polyhedron and the refracted light colors of the respective positions on the front face of the transparent polyhedron.

13. The device according to claim 12, characterized in that the obtaining the reflected light colors of the respective positions on the front face of the transparent polyhedron comprises:

sampling on a dispersion map according to the reflected light directions of the respective positions on the front face of the transparent polyhedron to obtain first color components of the respective positions on the front face of the transparent polyhedron;

obtaining second color components of the respective positions on the front face of the transparent polyhedron according to an ambient light source and the reflected light directions of the respective positions on the front face of the transparent polyhedron;

sampling on the ambient map according to the reflected light directions of the respective positions on the front face of the transparent polyhedron to obtain third color components of the respective positions on the front face of the transparent polyhedron;

obtaining fourth color components of the respective positions on the front face of the transparent polyhedron, the fourth color components of the respective positions on the front face of the transparent polyhedron being outer products of the first color components and the second color components;

weighted-mixing the first color components of the respective positions on the front face of the transparent polyhedron and the fourth color components of the respective positions on the front face of the transparent polyhedron according to second weighting coefficients to obtain fifth color components of the respective positions on the front face of the transparent polyhedron; and obtaining outer products of the fifth color components and the third color components of the respective positions on the front face of the transparent polyhedron as the reflected light colors of the respective positions on the front face of the transparent polyhedron.

14. The device according to claim 12, characterized in that the obtaining the refracted light colors of the respective positions on the front face of the transparent polyhedron comprises: sampling on the internal rendering effect map according to the refracted light directions of the respective positions on the front face of the transparent polyhedron to obtain the refracted light colors of the respective positions on the front face of the transparent polyhedron.

15. The device according to claim 12, characterized in that the obtaining the colors of the respective positions on the front face of the transparent polyhedron according to the reflected light colors of the respective positions on the front face of the transparent polyhedron and the refracted light colors of the respective positions on the front face of the transparent polyhedron comprises:

weighted-mixing the reflected light colors of the respective positions on the front face of the transparent polyhedron and the refracted light colors of the respective positions on the front face of the transparent polyhedron according to the Fresnel coefficient to obtain the colors of the respective positions on the front face of the transparent polyhedron.

16. The device according to claim 9, characterized in that the obtaining the colors of the respective positions on the front face of the transparent polyhedron comprises: obtaining reflected light colors of the respective positions on the front face of the transparent polyhedron; obtaining refracted light colors of the respective positions on the front face of the transparent polyhedron; and obtaining colors of the respective positions on the front face of the transparent polyhedron according to the reflected light colors of the respective positions on the front face of the transparent polyhedron and the refracted light colors of the respective positions on the front face of the transparent polyhedron.

17. A non-transitory computer readable storage medium, characterized in that a computer program is stored on the computer-readable storage medium, the computer program, when executed by a computing device, causing the computing device to perform a method of rendering a transparent polyhedron, the method comprising: obtaining reflected light colors of respective positions on a back face of the transparent polyhedron; sampling on a background image or an ambient map according to refracted light directions of the respective positions on the back face of the transparent polyhedron to obtain refracted light colors of the respective positions on the back face of the transparent polyhedron, the background image being an image obtained through image collection in a real scene, and the background image being opposite to the back face of the transparent polyhedron; obtaining colors of the respective positions on the back face of the transparent polyhedron according to the reflected light colors of the respective positions on the back face of the transparent polyhedron and the refracted light colors of the respective positions on the back face of the transparent polyhedron; obtaining colors of respective positions on a front face of the transparent polyhedron; weighted-mixing the colors of the respective positions on the back face of the transparent polyhedron and the colors of the respective positions on the front face of the transparent polyhedron according to a first weighting coefficient to obtain rendering colors of respective positions of the transparent polyhedron; and rendering the transparent polyhedron according to the rendering colors of the respective positions of the transparent polyhedron, wherein the obtaining the reflected light colors of the respective positions on the back face of the transparent polyhedron comprises: sampling on a contrast control map according to coordinates of the respective positions on the back face of the transparent polyhedron to obtain first color components of the respective positions on the back face of the transparent polyhedron; sampling on an internal rendering effect map according to reflected light directions of the respective positions on the back face of the transparent polyhedron to obtain second color components of the respective positions on the back face of the transparent polyhedron; and obtaining an outer product of the first color components and the second color components of the respective positions on the back face of the transparent polyhedron as the reflected light colors of the respective positions on the back face of the transparent polyhedron.

* * * * *